United States Patent
Rai et al.

(10) Patent No.: US 7,203,761 B1
(45) Date of Patent: Apr. 10, 2007

(54) METHOD AND APPARATUS FOR ROUTING DATA TO/FROM A MOBILE USER

(75) Inventors: Jagmohan S Rai, Southall (GB); Mark Anderson, London (GB); Shaun Wright, Felixstowe (GB); Christopher John Fenton, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/936,301

(22) PCT Filed: Mar. 8, 2000

(86) PCT No.: PCT/GB00/00819

§ 371 (c)(1),
(2), (4) Date: Sep. 12, 2001

(87) PCT Pub. No.: WO00/59178

PCT Pub. Date: Oct. 5, 2000

(30) Foreign Application Priority Data

Mar. 31, 1999 (GB) .................................. 9907464.3
Jul. 13, 1999 (EP) .................................. 99305544

(51) Int. Cl.
G06F 15/173 (2006.01)
G06F 15/10 (2006.01)

(52) U.S. Cl. ...................... 709/238; 709/249
(58) Field of Classification Search ................ 709/202, 709/203, 238–244, 249–250, 209
See application file for complete search history.

(56) References Cited

U.S. PATENT DOCUMENTS

| 5,475,738 A | * | 12/1995 | Penzias | .................... 379/88.14 |
| 5,566,170 A | * | 10/1996 | Bakke et al. | ................ 370/382 |
| 5,802,278 A | * | 9/1998 | Isfeld et al. | ................ 709/249 |
| 5,812,865 A | | 9/1998 | Theimer et al. | |
| 5,825,759 A | * | 10/1998 | Liu | ............................ 370/331 |
| 5,828,836 A | * | 10/1998 | Westwick et al. | ........... 709/200 |
| 5,835,710 A | * | 11/1998 | Nagami et al. | ............. 709/250 |

(Continued)

FOREIGN PATENT DOCUMENTS

WO    WO 97 37500 A    10/1997

OTHER PUBLICATIONS

C Perkins , RFC 2002, Oct. 1996, Internet RFC/STD/FYI/BCP Archives.*

(Continued)

*Primary Examiner*—Rupal Dharia
*Assistant Examiner*—Chirag R. Patel
(74) *Attorney, Agent, or Firm*—Nixon & Vanderhye P.C.

(57) ABSTRACT

A home agent, attached to a home network, receives, adapts and forwards messages intended for a mobile node attached to one of a plurality foreign networks. The home agent, having received a message, passes the message on to a processing unit to assess whether the message should be adapted so as to be compatible with the destination foreign network and to adapt the message accordingly. The adapted message is returned to the home agent to be encapsulated and tunnelled to a foreign agent attached to the destination foreign network. The foreign agent decapsulates the message and passes it on to the mobile node. This method has the advantage that the mobile node is able to receive messages regardless of the type of network to which it is attached.

19 Claims, 4 Drawing Sheets

U.S. PATENT DOCUMENTS

| | | | |
|---|---|---|---|
| 5,841,769 A | 11/1998 | Okanoue et al. | |
| 5,894,478 A * | 4/1999 | Barzegar et al. | 370/401 |
| 6,366,561 B1 * | 4/2002 | Bender | 370/238 |
| 6,487,605 B1 * | 11/2002 | Leung | 709/245 |
| 6,519,224 B2 * | 2/2003 | Hrastar et al. | 370/227 |
| 6,553,410 B2 * | 4/2003 | Kikinis | 709/227 |
| 6,557,031 B1 * | 4/2003 | Mimura et al. | 709/218 |
| 6,636,498 B1 * | 10/2003 | Leung | 370/338 |
| 6,771,623 B2 * | 8/2004 | Ton | 370/331 |
| 6,804,221 B1 * | 10/2004 | Magret et al. | 370/338 |
| 6,816,912 B1 * | 11/2004 | Borella et al. | 709/238 |
| 6,862,274 B1 * | 3/2005 | Tsao et al. | 370/338 |
| 2002/0112240 A1 * | 8/2002 | Bacso et al. | 725/47 |
| 2003/0017845 A1 * | 1/2003 | Doviak et al. | 455/556 |

OTHER PUBLICATIONS

Jon Postel, RFC 791, Sep. 1981, Internet RFC/STD/FYI/BCP Archives.*

Perkins (RFC—IP Mobility Support, Request for Comments: 2002, IBM, Network Working Group).*

Xylomenos G. (IP multicasting for wireless mobile hosts, Military Communications Conference, 1996, Milcom '96, IEEE, 21-24.*

Xylomenos G. (IP multicasting for mobile hosts, Communications Magazine, IEEE, Jan. 1997, vol. 35, Issue 1.*

Kreller et al., "UMTS:A Middleware Architecture and Mobile API Approach", IEEE Personal Communications, US, IEEE Communications Society, vol. 5, No. 2, Apr. 1998 (19998-04), pp. 32-38, XP000751833 ISSN: 1070-9916.

Perkins, "Mobile-AP, AD-HOC Networking, and Nomadicity", Proceedings of the Annual International Computer Software and Applications Conference (COMPSAC), US, Los Alamitos, IEEE Comp. Soc. Press, vol. Conf. 20, pp. 472-476, XP000684381, ISBN: 0-8186-7579-9.

International Search Report.

* cited by examiner

Fig.3.

| IP Address | Quality Parameters | | | User-Defined | | Network |
|---|---|---|---|---|---|---|
| | Data Rate (kbit/s) | Access Delay (ms) | Bit Error Rate (Max) | Date Type | Security Risk | |
| 192.0.1.255 | 20 | 120 | 10e-5 | Voice | Low | GSM GPRS |
| 192.6.2.255 | 9.6 | 120 | 10e-3 | N/A | Low | GSM Transparent |
| 192.6.0.1 | 9.6 | Variable | 10e-5 | Text | Low | GSM Non-Transparent |
| 192.6.3.8 | 10000 | N/A | 10e-9 | N/A | Low | Wired LAN |
| 192.6.5.1 | 2000 | 50 | 10e-4 | N/A | High | Wireless LAN |

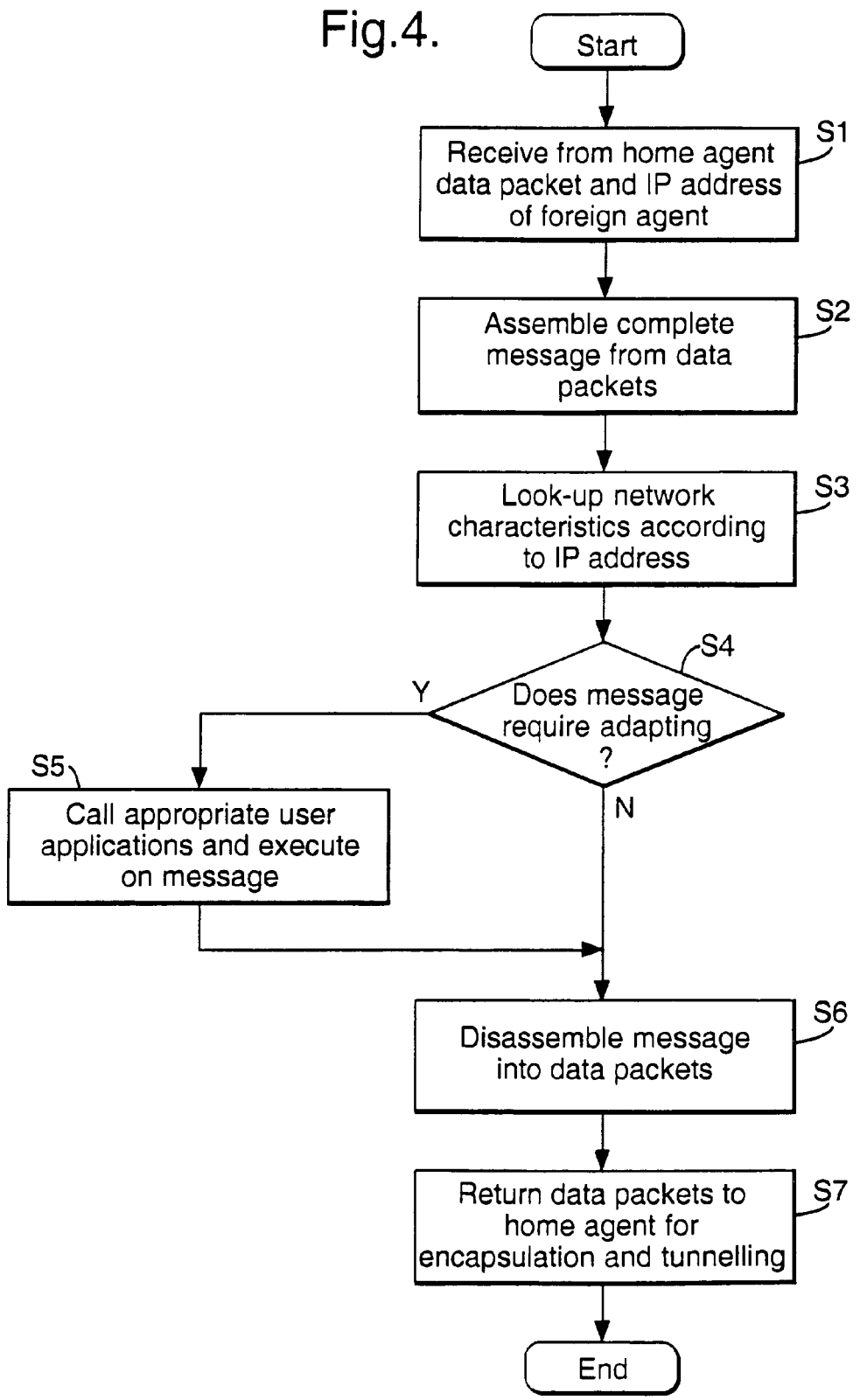

METHOD AND APPARATUS FOR ROUTING DATA TO/FROM A MOBILE USER

BACKGROUND OF THE INVENTION

1. Field of the Invention

The present invention relates to the routing of data within communications networks, including but not confined to networks such as the Internet and particularly, but not exclusively, to a method of routing data directed to a mobile node. The mobile node may be a mobile host, such as a portable computer, or it may be a router which is responsible for the mobility of one or more entire networks, for example, the mobile data network within an aircraft. In either case, the mobile node may change its point of attachment from one network or sub-network to another.

2. Related Art

The routing of data around the diverse networks which make up the Internet is based on a protocol known as the Internet Protocol (IP). Data is transferred in the form of data units known as IP datagrams between points in the Internet specified by IP addresses. The detailed specification of IP is available in a "Request for Comments" document, RFC 791, maintained by the Internet Engineering Task Force (IETF). RFC documents are widely available on the Internet.

The current version of IP, known as IPv4, does not itself support mobility, but a protocol entitled "IP Mobility Support", commonly referred to as Mobile IP, has been designed to enhance IPv4 to support mobility. This protocol is described in document RFC 2002, available as detailed above. The next generation of IP (IPv6) is being specifically designed to deal with the mobility requirement.

IPv4 assumes that a node's IP address uniquely identifies the node's fixed point of attachment to the Internet. If the node is transferred to a different point, it can only be contacted by allocating it a new IP address. Mobile IP, however, enables a mobile node, such as a laptop or palmtop computer, to send and receive IP datagrams over the Internet regardless of the physical location at which it is connected to the Internet and without changing its IP address.

However, a mobile node may find itself in many different environments, attached to data networks of varying types that serve different purposes.

A mobile node may be linked to a network by a variety of different media, some suited to transmission of high volume data, some not. Some networks may themselves not be able to support higher data rates. A mobile user attached to a particular network may wish to receive data in a particular format, for example to receive web-page data in abridged form, without pictures, or an e-mail in the form of a voice message. In a particular example, a "Wireless Application Protocol" (WAP) has been specially developed for the bandwidth constraints and screen size associated with cellular telephony. If a user is currently using a network suited to that technology, it would be convenient to have the data transmitted in that form. However, if the user is connected to a higher bandwidth system, he may wish to receive the data in a less abbreviated form more appropriate to that other network.

There may also be special associations between the home and visited networks of the transmitter and sender of the data, for example functionality only available if both parties are working on (visiting) the same network, or a service level agreement made between the network operators.

BRIEF SUMMARY OF THE INVENTION

According to an exemplary embodiment of the present invention there is provided a method of routing communications data to a user located in one of a plurality of data networks by a router, the router having a data store provided with data relating to characteristics of the networks and the associations between the networks, the method comprising:

receiving user location information relating to the identity of the data network to which the user is currently connected;

receiving communications data to be sent to the user;

retrieving from the store the associated characteristics of the data network to which the user is currently connected, and the associations between that network and other networks;

adapting the communications data so as to be compatible with the retrieved characteristics, and sending the adapted communications data to the user.

The router may be a home agent attached to a home network.

The communications data may comprise text data.

The adapted communications data may comprise voice data.

The adapting of the communications data may comprise summarising the communications data.

The adapted communications data may be received by an intermediary router and re-routed to the user.

The user and the intermediary router may be attached to the same one of the plurality of data networks.

According to an exemplary embodiment of the present invention there is also provided a computer program to be loaded on a computer to route communications data to a user located in one of a plurality of data networks each with associated characteristics, such that the computer:

stores data relating to characteristics of the networks and the associations between the networks;

receives user location information, wherein the user location information includes the identity of one of the plurality of data networks;

receives communications data to be sent to the user;

adapts the communications data so as to be compatible with the associated characteristics of the data network to which the user is currently connected, and the associations between that network and other networks; and sends the adapted communications data to the user.

The computer program may have been down-loaded from a server and stored in storage means prior to loading on a computer.

According to an exemplary embodiment of the present invention, there is further provided a computer program stored on a medium, for controlling a computer to route communications data to a user located in one of a plurality of data networks by:

receiving user location information which includes the identity of one of the plurality of data networks;

receiving communications data to be sent to the user;

retrieving, from a store of data relating to characteristics of the networks and the associations between the networks, the data relating to the characteristics of the said one of the plurality of data network;

adapting the communications data so as to be compatible with the associated characteristics of said one of the plurality of data networks and sending the adapted communications data to the user.

According to an exemplary embodiment of the present invention, there is further provided processing means to carry out data processing on communication data, the processing means comprising:

first receiving means to receive network information relating to each of a plurality of data networks, wherein the network information includes data network type;

storage means to store network information;

second receiving means to receive user location information from a router, wherein the user location information includes the identity of a selected one of the plurality of data networks;

third receiving means to receive from the router communications data to be sent to the user;

information retrieval means to retrieve network information relating to the selected data network;

adapting means to adapt the communications data so as to be compatible with the data network type of the one of the plurality of data networks and output means to output the adapted communications data to the router.

BRIEF DESCRIPTION OF THE DRAWINGS

An embodiment of the present invention will now be described, by way of example, with reference to the accompanying drawings, in which:

FIG. 1b shows the flow of data to a mobile node attached to a foreign network in the system of FIG. 1a;

FIG. 3 is a schematic of a parameter table and

FIG. 4 is a process flow diagram by which data in a message is adapted by the processing unit.

DETAILED DESCRIPTION OF EXEMPLARY EMBODIMENTS

Figure 1A:
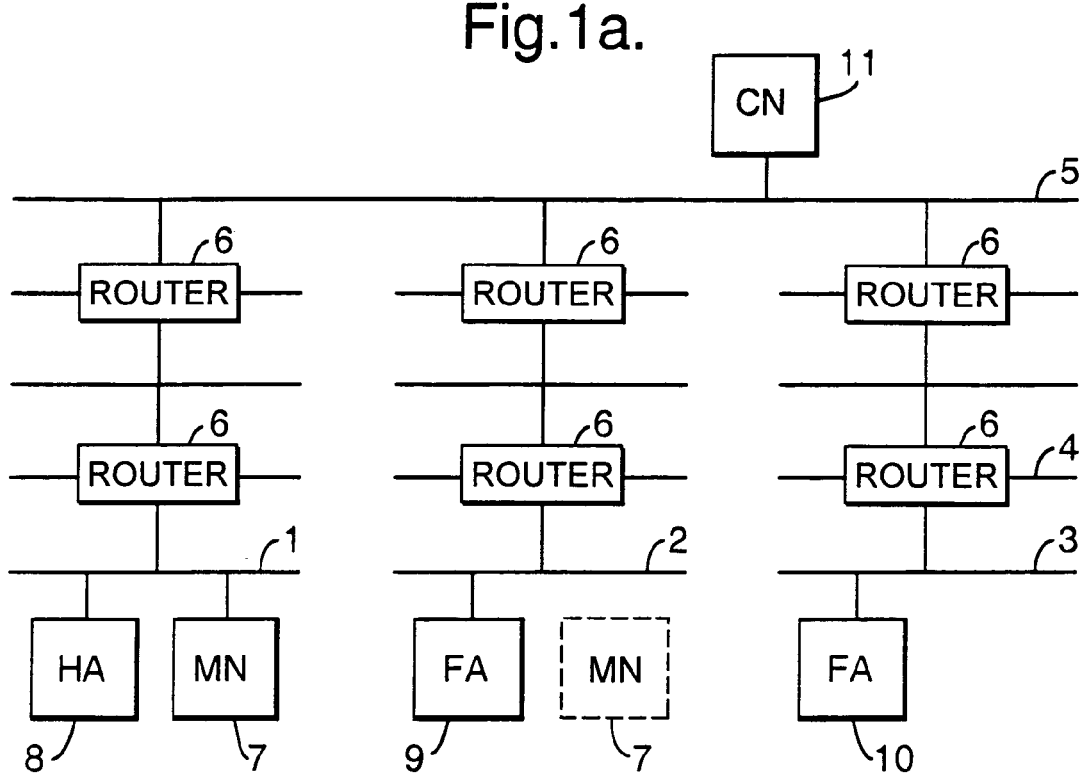
FIG. 1a is a schematic diagram of the general arrangement of a mobile IP based system.

Referring to FIG. 1a, the Internet comprises a large number of networks and sub-networks 1, 2, 3, 4, 5 connected via routers 6. A router may be a general purpose computer programmed to perform routing tasks. Increasingly, routers throughout the Internet are dedicated pieces of hardware provided by companies such as Cisco Systems, California, USA. In either case, the functionality of a router intended for use in an IP based network is defined in RFC 1812.

A mobile node (MN) 7, which may be a laptop or notepad computer or a mobile telephone terminal, is normally connected to the Internet via a home network 1. The unique IP address assigned to the node 7 is known as its home address. Mobility agents, known as foreign agents (FA) and home agents (HA), advertise their presence on a network via availability messages known as Agent Advertisements. A mobility agent is typically a router connected to a particular network; for example, a home agent 8 is a router connected to the home network 1 and foreign agents 9, 10 comprise routers connected to foreign networks 2, 3 respectively. The mobile node 7 may optionally solicit an Agent Advertisement message from any local mobility agents via an Agent Solicitation message. By receiving Agent Advertisements, the mobile node 7 is able to determine whether it is on its home network 1 or on a foreign network 2, 3, 4, 5.

While the mobile node 7 is on its home network, it has no need for mobility services. When the mobile node 7 is temporarily moved to a first foreign network 2, as shown by the dotted box in FIG. 1a, it obtains a temporary care-of address on the foreign network 2. This can be a foreign agent care-of address, which is the IP address of the foreign agent, obtained by receiving or soliciting Agent Advertisements from any foreign agents based on the foreign network 2. Alternatively, the care-of address may be obtained by using an external assignment mechanism, such as Dynamic Host Configuration Protocol (DHCP) (the reader is referred to RFC 1541 for further information), in which case it is known as a co-located care-of address.

The mobile node 7 then registers its new care-of address with its home agent 8 by exchanging Registration Request and Registration Reply messages with it. Registration provides a mechanism by which mobile nodes can communicate their current reachability information to their home agent. The registration process is described in more detail below, assuming that the mobile node 7 on the foreign network 2 is registering a foreign agent care-of address received via an Agent Advertisement from, for example, first foreign agent 9.

First, the mobile node 7 sends a Registration Request message to the first foreign agent 9, which processes it and forwards it to the mobile node's home agent 8. The Registration Request message includes the IP address of the foreign agent. The home agent 8 sends a Registration Reply message to the first foreign agent 9 granting (or denying) the registration request. The first foreign agent 9 processes this Reply and forwards it to the mobile node 7. This process establishes a temporary address for the mobile node 7 to which datagrams can be delivered while the node is roaming away from its home network 1.

If the mobile node 7 is returning to its home network 1 having been on a foreign network 2, 3, it re-registers with its home agent 8, through exchange of Registration Request and Registration Reply messages.

Figure 1B:
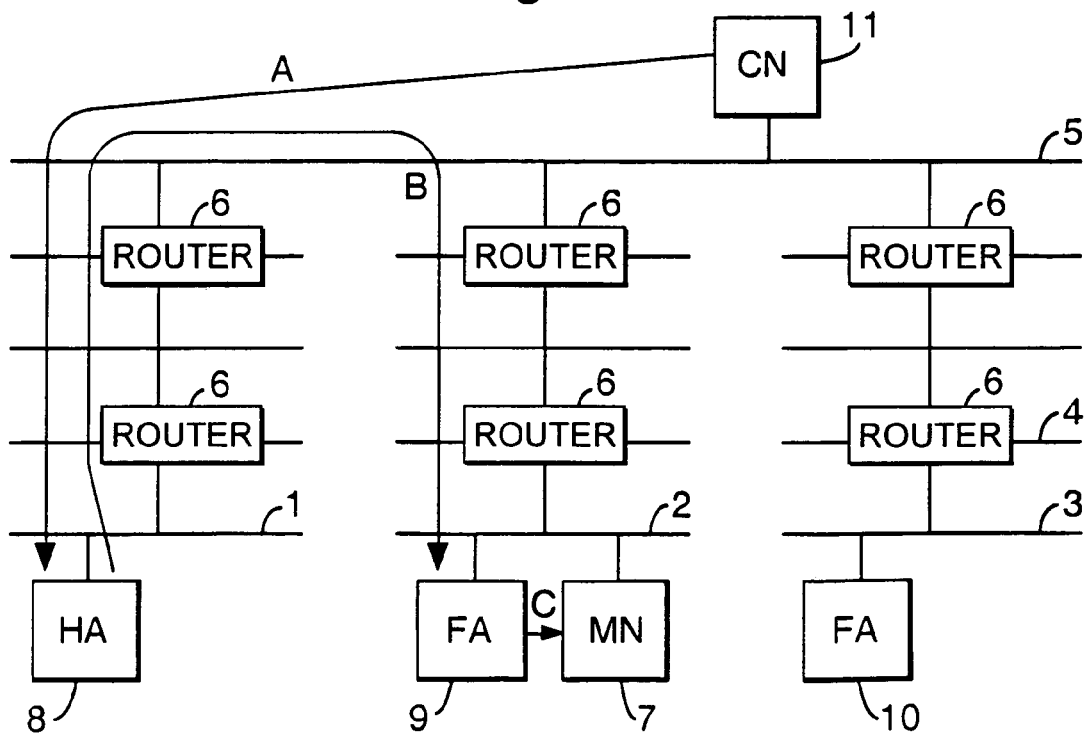

Referring to FIG. 1b, when a correspondent node (CN) 11 attached to a network 5 sends a message intended for the mobile node 7, while it is connected to the first foreign network 2, the message is intercepted by the home agent 8, as shown by arrow A. The home agent 8 encapsulates the datagrams forming the message with the care-of address for the mobile node 7, in this example being the IP address of the first foreign agent 9, and forwards the message to the first foreign agent 9. The transmission of the encapsulated datagrams, shown by arrow B, is known as tunnelling. The first foreign agent 9 receives the datagrams, decapsulates them and forwards them to the mobile node 7, as shown by arrow C. Messages from the mobile node 7 to other nodes in the Internet need not follow this route, but may be sent directly via an appropriate router, which may be the first foreign agent 9.

The concepts of encapsulation and tunnelling are described in detail in RFC 2003, "IP Encapsulation within IP". The model is that a tunnel is the path followed by a datagram while encapsulated. Encapsulation allows an IP datagram to be hidden from intermediate routers which would incorrectly attempt to route it to the mobile node. Instead, the datagram is routed between the encapsulator and a knowledgeable decapsulator, such as a foreign agent, which can correctly route the datagram. The home agent 8 and first foreign agent 9 are known as the endpoints of the tunnel. In the case of the co-located care-of address, the mobile node itself acts as an endpoint of the tunnel.

Examples of various tunnelling schemes which enable efficient routing of data to a mobile node to be maintained when the mobile node moves between its home network and foreign networks are given in U.S. Pat. No. 5,325,362 (Aziz) and Johnson D B: "Ubiquitous Mobile Host Internetworking", Proceedings of the workshop on workstation operating systems, 14 Oct. 1993, pp. 85–90, XP000672247.

Figure 2:
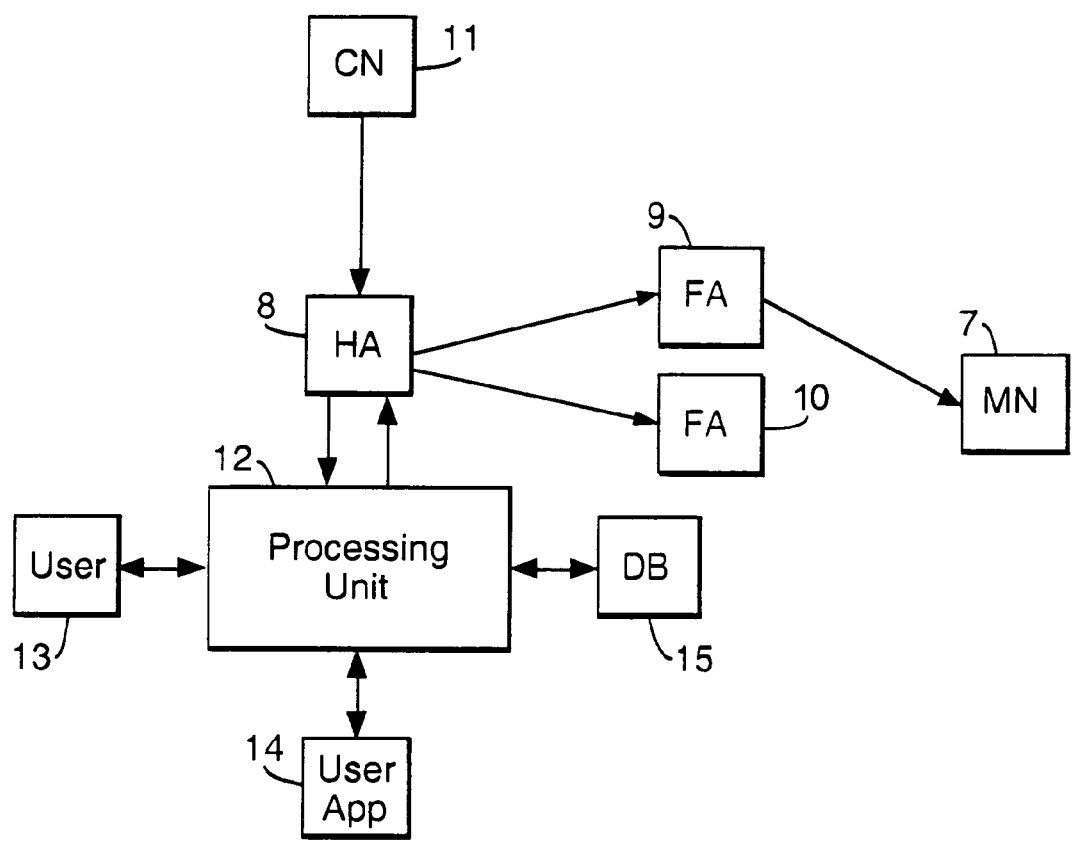
FIG. 2 is a schematic block diagram of a system according to the present invention for use with the method according to the present invention.

Referring to FIG. 2 the home agent 8, for example a personal computer running software which provides routing functionality, is configured so that before any datagrams are tunnelled to the first foreign agent 9, a processing unit 12 can intervene.

In this example, the function of the processing unit 12 is implemented in software on the same general purpose computer running the software which provided the routing functionality. The software, in the form of an executable computer program, is stored on a hard disc or removable hard drive, having been down-loaded from a server or installed from installation discs. The program is loaded from storage into computer memory and executed.

The processing unit 12 comprises a user interface 13, as well as processing capability to execute user applications 14. It is also provided with data storage in the form of a user details database 15. The user details database 15 contains a list of foreign agents 9, 10, together with their IP addresses and several characteristics of the foreign networks to which they are attached. The principal function of the processing unit 12 is determine whether data contained in a message destined for a particular foreign network requires adapting depending on the characteristics of the destination network and to carry out any necessary adaptation.

Before the system can operate, a list of foreign agents 9,10 and the characteristics of the foreign networks 2, 3 to which each foreign agent is attached is entered into the user details database 15. In this example, the first and second foreign networks 2, 3 are a telecommunications and an office network respectively. Network characteristics are entered either manually, through the user interface 13, and/or automatically updated from a foreign network server. This list of foreign agents 9,10 together with the network characteristics associated with them are updated, whenever a foreign network is added, modified or removed.

Referring to FIG. 3, a parameter table 16 held in the database comprises; IP addresses 17 of foreign agents, network quality parameters 18, user-defined parameters 19 and characteristics 20 of the connection between a foreign agent 9, 10 and mobile node 7. For example, network quality parameters 18 include data transfer rates to foreign agents 18a, access delays 18b and bit error rates 18c. User-defined parameters 19 include the type of data 19a expected to be received by the mobile node 7 and security risk 19b. If a foreign network 2, 3 is known to be insecure, then it is preferable not to send sensitive data.

A method of operating the system will now be described with reference to FIG. 4.

The mobile node 7, in the form of a lap-top personal computer, is attached to a first foreign network 2 by a global system for mobile communications general packet radio service (GSM GPRS). This connection has low data capacity and is not suited to high volume transfer of data. The mobile node 7 registers its care-of address with the home agent 8, which in this example is the IP address of the first foreign agent 9, according to the process already described.

The user wishes to download an e-mail message from a mail server. Therefore, in this example the correspondent node 11 is the mail server. The mail server divides the e-mail message into packets and sends it to the home agent 8.

The home agent 8 receives the data packets and passes them on, together with the care-of address, to the processing unit 12. In this example, the IP address is 192.0.1.255 (Step S1).

The processing unit 12 waits until it has assembled the complete e-mail message from constituent data packets before proceeding further (Step S2). Once the e-mail has been assembled, the processing unit 12 searches through the parameter table, until it finds the corresponding IP address of the first foreign agent 9 and extracts network data associated with it (Step S3).

The processing unit 12 decides whether the e-mail message should be adapted and whether it is safe to send it. According to the data rate entry 18a, the foreign network 2 is characterised as having a low data capacity and so the e-mail message is ear-marked to be summarised. According to data type user-preference 19a, any text messages should be converted into voice data. According security rating entry 19b, it is safe to send sensitive messages to the first foreign network 2 (Step S4).

To summarise the e-mail message, the processing unit 12 calls e-mail summarisation software, for example British Telecommunications plc's ProSum, and executes the application on the e-mail message. Having been summarised, the e-mail message is then converted into a voice message by a text-to-voice conversion program, for example "Monologue" which generates digitised speech data (Step S5). Steps S4 and S5 may be repeated to further adapt data contained in the message according to other network characteristics.

Once the processing unit 12 has finished adapting the e-mail into a voice message, it disassembles the void message data into data packets (Step S6) and returns them to the home agent 8, for the packets to be encapsulated and tunnelled to the foreign network 2 (Step S7).

The encapsulated packets are received by the first foreign agent 9 where they are decapsulated and transmitted over a GSM GPRS link to the mobile node 7. The mobile node 7 waits until the complete e-mail has been received and notifies the user, whereupon the user is able to play and listen to the summarised e-mail message.

It will be appreciated that many modifications can be made to the embodiment described above.

For example, the processing unit 12, rather than assembling an e-mail from data packets before carrying out data adaptation, data adaptation can be carried out on each packet individually.

The adaptation carried out may be conversion of data from one graphics format into another. Examples of graphics format include, GIF, JPEG and TIFF.

The processing unit 12 may be implemented using dedicated hardware, rather than using a general purpose computer.

The advantage of such a system is that a user may receive information messages, regardless of the format of the initially sent data, the intended purpose of the data and also regardless of the network to which the user is attached.

What is claimed is:

1. A method of routing communications data to a mobile user located in one of a plurality of data networks by a router, the router having a data store provided with data relating to characteristics of the networks and the associations between the networks, the method comprising:

receiving mobile user location information relating to the identity of the data network to which the mobile user is currently connected;

receiving and assembling from plural data packets communications data comprising a complete message to be sent to the mobile user, retrieving from the store the associated characteristics of the data network to which the mobile user is currently connected, and the associations between that network and other networks;

adapting a presentational form of the complete message to another presentational form compatible with the retrieved characteristics of the data network, and disassembling the adapted message into data packets and sending the disassembled data packets to the mobile user.

2. A method as in claim 1 wherein the router is a home agent attached to a home network.

3. A method as in claim 1 wherein the communications data comprises text data.

4. A method as in claim 3 wherein the adapted communications data comprises voice data.

5. A method as in claim 1 wherein the adaptation of the presentational form comprises reducing its size by summarizing the communications data.

6. A method as in claim 1 wherein the adapted communications data is received by an intermediary router and re-routed to the mobile user.

7. A method as in claim 6 wherein the mobile user and the intermediary router are attached to the same one of the plurality of data networks.

8. A digital storage medium containing computer program to be loaded on a computer to route communications data to a mobile user located in one of a plurality of data networks each with associated characteristics, such that the computer:

stores data describing characteristics of the networks and associations between the networks;

receives mobile user location information, wherein the mobile user location information includes the identity of one of the plurality of data networks;

receives and assembles from plural data packets communications data comprising a complete message to be sent to the mobile user;

adapts a presentational form of the complete message to another presentational form compatible with the associated characteristics of the data network to which the mobile user is currently connected, and the associations between that network and other networks; and disassembles the adapted message into data packets and sends the disassembled data packets to the mobile user.

9. A digital storage medium containing computer program in claim 8 wherein the computer program has been downloaded from a server and stored in digital storage media.

10. A computer program stored on a storage medium, for controlling a computer to route communications data to a mobile user located in one of a plurality of data networks by:

receiving mobile user location information which includes the identity of one of the plurality of data networks;

receiving and assembling from plural data packets communications data comprising a complete message to be sent to the mobile user;

retrieving, from a store of data describing characteristics of the networks and associations between the networks, data relating to the characteristics of said one of the plurality of data networks;

adapting a presentational form of the complete message so-as-to-be-to another presentational form compatible with the associated characteristics of said one of the plurality of data networks and disassembling the adapted message into data packets and sending the disassembled data packets to the mobile user.

11. A data processor adapted to carry out data processing on communication data, the processor comprising:

a first receiver adapted to receive network information describing each of a plurality of data networks, wherein the network information includes data network type;

digital storage adapted to store network information;

a second receiver adapted to receive mobile user location information from a router, wherein the mobile user location information includes the identity of a selected one of the plurality of data networks;

a third receiver adapted to receive from the router communications data to be sent to the mobile user comprising a complete message assembled from plural data packets;

an information retrieval processor adapted to retrieve network information relating to the selected data network;

an adapting processor adapted to adapt a presentational form the complete message to another presentational form compatible with the data network type of the one of the plurality of data networks and an output adapted to disassemble the adapted complete message into data packets and output the adapted disassembled data packets to the router.

12. A method as in claim 1, wherein the adaptation of the presentational form comprises converting image data of the complete message in a first graphics format to another graphics format.

13. A method as in claim 1, wherein the adaptation of the presentational form comprises removal of at least some of the data content.

14. A digital storage medium containing computer program in claim 8 wherein the adaptation of the presentational form comprises converting image data of the complete message in a first graphics format to another graphics format.

15. A digital storage medium containing computer program in claim 8 wherein the adaptation of the presentational form comprises removal of at least some of the data content.

16. A digital storage medium containing computer program in claim 8 wherein the adaptation of the presentational form comprises converting text data to voice data.

17. A computer program stored on a storage medium as in claim 10, wherein the adaptation of the presentational form comprises converting image data of the complete message in a first graphics format to another graphics format.

18. A computer program stored on a storage medium as in claim 10, wherein the adaptation of the presentational form comprises removal of at least some of the data content.

19. A computer program stored on a storage medium as in claim 10, wherein the adaptation of the presentational form comprises converting text data to voice data.

* * * * *